US011131088B2

(12) United States Patent
Benton et al.

(10) Patent No.: US 11,131,088 B2
(45) Date of Patent: Sep. 28, 2021

(54) HINGED CONNECTOR

(71) Applicant: Simpson Strong-Tie Company Inc., Pleasanton, CA (US)

(72) Inventors: James M. Benton, Yuba City, CA (US); Rachel Marie Holland, San Ramon, CA (US); Thomas G. Evans, Dublin, CA (US); Timothy M. Stauffer, Pleasant Hill, CA (US)

(73) Assignee: Simpson Strong-Tie Company Inc., Pleasanton, CA (US)

( * ) Notice: Subject to any disclaimer, the term of this patent is extended or adjusted under 35 U.S.C. 154(b) by 0 days.

(21) Appl. No.: 16/258,365

(22) Filed: Jan. 25, 2019

(65) Prior Publication Data
US 2019/0234064 A1 Aug. 1, 2019

Related U.S. Application Data

(60) Provisional application No. 62/622,727, filed on Jan. 26, 2018.

(51) Int. Cl.
*E04B 1/58* (2006.01)
*E04B 1/26* (2006.01)

(52) U.S. Cl.
CPC ........ *E04B 1/58* (2013.01); *E04B 2001/2616* (2013.01); *E04B 2001/5856* (2013.01); *E04B 2001/5862* (2013.01); *E04B 2001/5868* (2013.01)

(58) Field of Classification Search
CPC ..... Y10T 403/32606; Y10T 403/32967; Y10S 403/15; E04B 1/3441; E04B 2001/2616; E04B 1/344; E04B 1/58; E04B 2001/5856; E04B 2001/5862; E04B 2001/5868; E04C 3/005; E04C 3/17; E04C 3/29

See application file for complete search history.

(56) References Cited

U.S. PATENT DOCUMENTS

| 506,006 A | 10/1893 | Kreider |
| 1,551,716 A * | 9/1925 | Van Der Kloet ..... E04B 1/5843 403/217 |
| 1,692,351 A | 11/1928 | Ropp |

(Continued)

FOREIGN PATENT DOCUMENTS

| DE | 10 2006 038 054 A1 | 2/2008 |
| EP | 0 357 273 | 3/1990 |

(Continued)

OTHER PUBLICATIONS

Patent Cooperation Treaty (PCT), The International Search Report and the Written Opinion of the International Searching Authority, or the Declaration: PCT/US2019/015285, dated May 14, 2019, 12 pages, International Searching Authority, United States Patent Office, Washington, D. C., USA.

(Continued)

*Primary Examiner* — Ryan D Kwiecinski
*Assistant Examiner* — Matthew J Gitlin
(74) *Attorney, Agent, or Firm* — Charles R. Cypher

(57) ABSTRACT

A hinged connector is used to attach two generally coplanar first and second structural members while allowing for pivotal movement of the structural members in the plane of the structural members about an axis that is transverse or perpendicular to the plane in which the structural members rotate.

19 Claims, 12 Drawing Sheets

(56) References Cited

U.S. PATENT DOCUMENTS

| | | | |
|---|---|---|---|
| 3,337,946 A | | 3/1963 | Anderson et al. |
| 3,535,845 A | | 10/1970 | Troutner |
| 3,605,355 A | | 9/1971 | Solesbee |
| 3,785,108 A | * | 1/1974 | Satchell .................. E04B 7/022 |
| | | | 52/645 |
| 3,823,522 A | * | 7/1974 | Jureit .................. E04B 1/3441 |
| | | | 52/641 |
| 4,167,090 A | | 9/1979 | Sanford |
| 4,261,155 A | | 4/1981 | Gilb |
| RE31,234 E | * | 5/1983 | Jureit .................. E04B 1/3441 |
| | | | 403/163 |
| 4,381,635 A | * | 5/1983 | Solo .................. E04B 1/2608 |
| | | | 52/639 |
| 4,513,474 A | | 4/1985 | Watabe |
| 4,744,192 A | | 5/1988 | Commins |
| 4,831,807 A | | 5/1989 | Bolt |
| 4,872,297 A | | 10/1989 | Hetzel et al. |
| 5,094,059 A | * | 3/1992 | Ganescu .................. E04B 1/3441 |
| | | | 16/371 |
| 5,199,966 A | | 4/1993 | Harvey et al. |
| 5,426,822 A | | 6/1995 | Weir |
| 5,553,961 A | * | 9/1996 | Olden .................. E04C 3/005 |
| | | | 403/119 |
| 5,660,012 A | | 8/1997 | Knudson |
| 5,720,571 A | | 2/1998 | Frobosilo et al. |
| 5,722,210 A | | 3/1998 | Baker et al. |
| 5,819,492 A | | 10/1998 | Konicek |
| 5,839,848 A | | 11/1998 | Sahramaa |
| 5,846,018 A | | 12/1998 | Frobosilo |
| 5,890,339 A | | 4/1999 | Willis |
| 6,125,524 A | | 10/2000 | Mueller |
| 6,401,422 B1 | * | 6/2002 | Olden .................. E04C 3/005 |
| | | | 52/641 |
| 6,430,887 B1 | * | 8/2002 | Daudet .................. E04B 1/3441 |
| | | | 16/223 |
| 6,662,517 B1 | * | 12/2003 | Thompson .............. E04B 7/045 |
| | | | 52/712 |
| 7,131,243 B1 | * | 11/2006 | Sirowatka .................. E04C 3/005 |
| | | | 52/604 |
| 7,200,972 B1 | | 4/2007 | Freeman et al. |
| 7,707,785 B2 | | 5/2010 | Lin |
| 7,716,877 B2 | * | 5/2010 | Gilstrap .................. E04B 7/045 |
| | | | 403/232.1 |
| 7,891,144 B2 | | 2/2011 | Gilstrap |
| 8,056,932 B2 | | 11/2011 | Wents |
| 8,245,479 B2 | | 8/2012 | Gannon et al. |
| 8,266,864 B2 | * | 9/2012 | Claypool .................. E04C 3/005 |
| | | | 52/645 |
| 8,453,403 B2 | | 6/2013 | Wheeler |
| 8,555,580 B2 | | 10/2013 | Vilasineekul |
| 9,045,895 B1 | * | 6/2015 | Lin .................. F16B 15/0053 |
| 10,246,876 B2 | | 4/2019 | Brean |
| 2003/0154685 A1 | * | 8/2003 | Williams .................. E04C 3/17 |
| | | | 52/702 |
| 2006/0185311 A1 | | 8/2006 | Attalla et al. |
| 2008/0277551 A1 | * | 11/2008 | Hackney .................. E04B 1/2604 |
| | | | 248/276.1 |
| 2010/0269445 A1 | * | 10/2010 | Gannon .................. E04O 3/005 |
| | | | 52/645 |
| 2014/0212203 A1 | | 7/2014 | Kochanawski |

FOREIGN PATENT DOCUMENTS

| | | |
|---|---|---|
| EP | 2 378 018 A2 | 10/2011 |
| FR | 2 981 865 | 5/2013 |
| GB | 1 362 019 | 7/1974 |

OTHER PUBLICATIONS

Simpson Strong-Tie Company Inc., Connectors for Wood Construction, Jan. 1, 1992, cover page, p. 33, back page, Catalog C-92H-1, Simpson Strong-Tie Company, Inc., Pleasanton, CA, United States.

Simpson Strong-Tie Company Inc., Wood Construction Connectors 2009-2010, Jan. 1, 2009, cover page, p. 147, back page, Catalog C-2009, Simpson Strong-Tie Company, Inc., Pleasanton, CA, United States.

Simpson Strong-Tie Company Inc., Wood Construction Connectors 2017-2018, Jan. 1, 2017, cover page, p. 142, back page, Catalog C-C-2017, Simpson Strong-Tie Company, Inc., Pleasanton, CA, United States.

* cited by examiner

HINGED CONNECTOR

BACKGROUND OF THE INVENTION

The present invention provides a connection between two structural members by means of a connector and fasteners. The connector is provided with a hinge so that the structural members can be joined and then shipped to a job site in a collapsed or folded arrangement. When the structural members arrive at the site and are ready to be erected they are moved to a second, unfolded position.

Hinged connectors are well known in the art and are particularly suitable for large trusses that need to be collapsed during shipping. The hinge joints are used at connections between members in the truss where it would be beneficial to connect the members at the factory where the truss is made but connect the members in such a manner that they can rotate with respect to each other so that the truss can be shipped in a collapsed state. U.S. Pat. No. 5,553,961, invented by Michael M. Olden and which issued in 1996 teaches a hinged connector that is useful for transporting trusses in a collapsed state. U.S. Pat. No. 5,553,961 was considered by its inventor to be an improvement patent over U.S. Reissue Pat. 31,234 which reissued May 10, 1983.

The present invention improves upon the prior art by providing a connector that is inexpensive to make and install yet it is strong and can be installed in pairs on both sides of the structural members to be connected.

SUMMARY OF THE INVENTION

It is an object of the present invention to provide a hinged connector that can make a strong connection between the structural members it connects while allowing the structural members to pivot with respect to each other. The hinged connector is used to attach two generally coplanar first and second structural members while allowing for pivotal movement of the structural members in the plane of the structural members about an axis that is transverse or perpendicular to the plane in which the structural members rotate.

It is a further object of the present invention to provide a connector where the fastener openings are arranged so that the connector can be used in pairs with the fasteners not interfering with each other.

It is further object of the invention to provide a connector where the members or plates that make up connector are formed with extensions that are joined in a manner to create a hinge. The extension of one of the members is provided with an offset so that the extensions can closely overlap to make for a strong connection. The connector is preferably made from sheet metal that is cold-formed such that the offset is formed from a pair of angled offsetting bends between the plate and the extension that has the hinge.

It is a further object of the invention to provide a connector where the pivotably connected members are formed with indexing flanges that engage edge surfaces of the structural members they connect to help properly position the connector or connectors. This can be particularly important when the hinged connectors are used in aligned pairs on opposed surfaces of the structural members. It is important that the axes of rotation of the hinges be aligned.

DETAILED DESCRIPTION OF THE INVENTION

Figure 11:
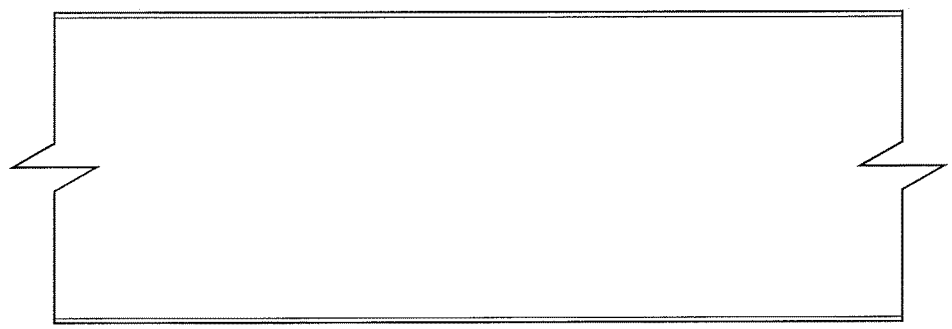
FIG. 11 is a side view of a connection made according to the present invention with the structural members connected by the connecter disposed in a collapsed state.
Figure 12:
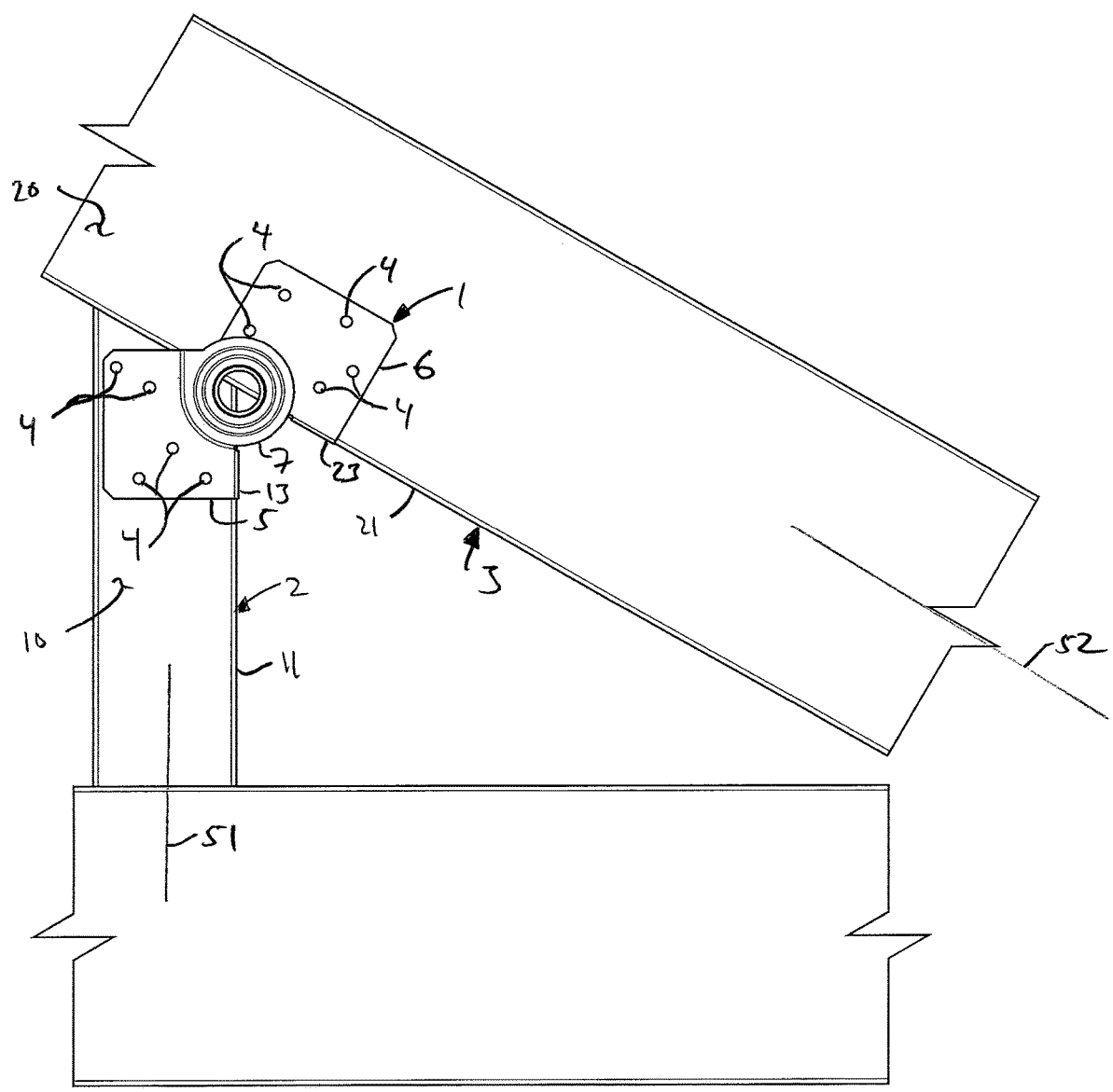
FIG. 12 is a side view of a connection made according to the present invention with the structural members connected by the connecter disposed in their final configuration when installed.
Figure 13:
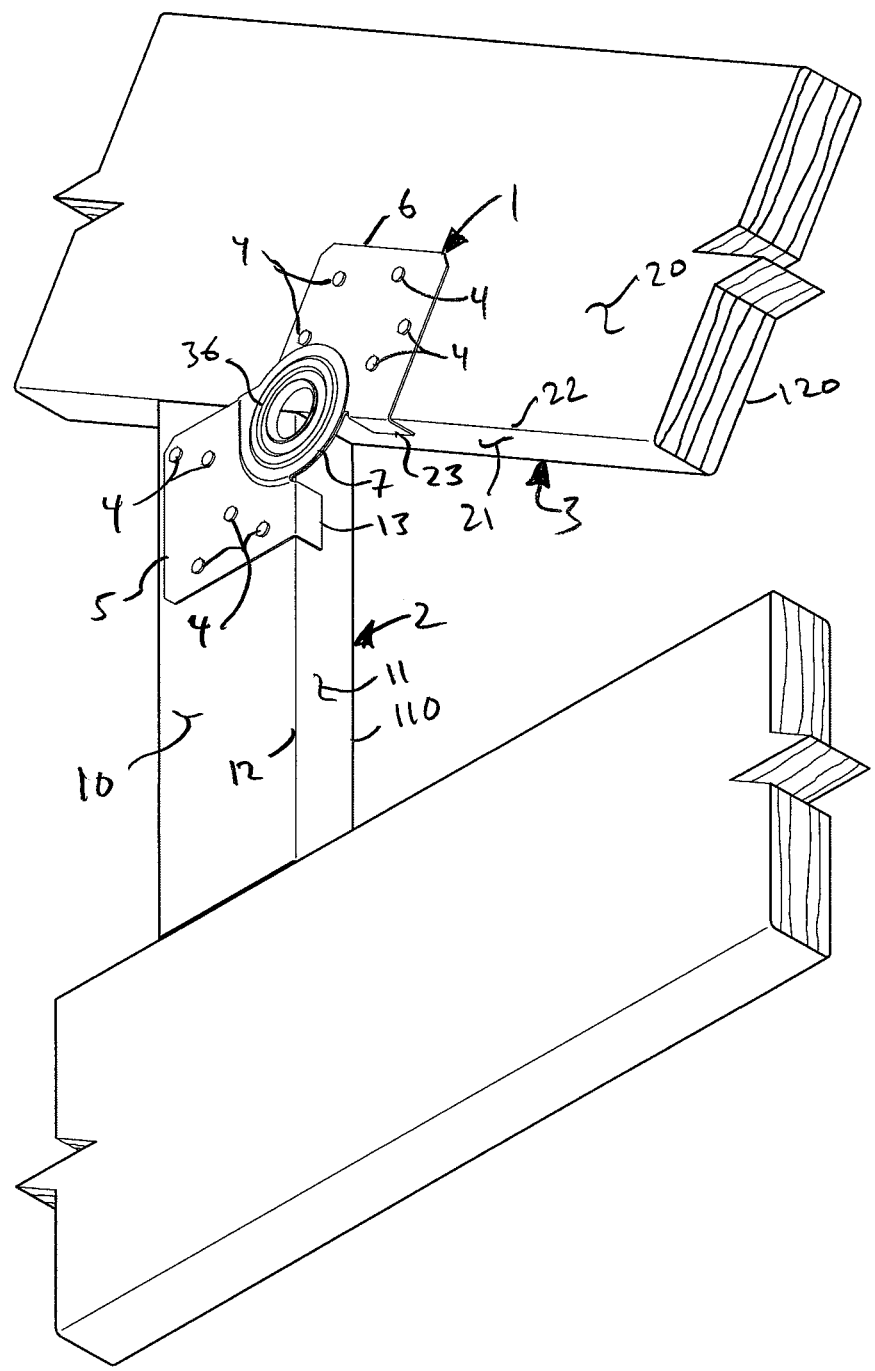
FIG. 13 is a perspective view of the connection shown in FIG. 12.

As shown in FIGS. 11 and 12, according to the present invention, the hinged connector 1 is attached to first structural member 2 and a second structural member 3. The connector 1 is attached to the first and second structural members 2 and 3 with fasteners 4. The preferred fasteners 4 are nails, but other fasteners such as screws or nail prong teeth may be used. The preferred connector 1 of the present invention is formed from overlapping base and top members 5 and 6 which are preferably made from sheet metal blanks. The overlapping members 5 and 6 are connected at a hinge 7. The connector, including the hinge, is preferably cold-formed from the sheet metal blanks.

Figure 1:
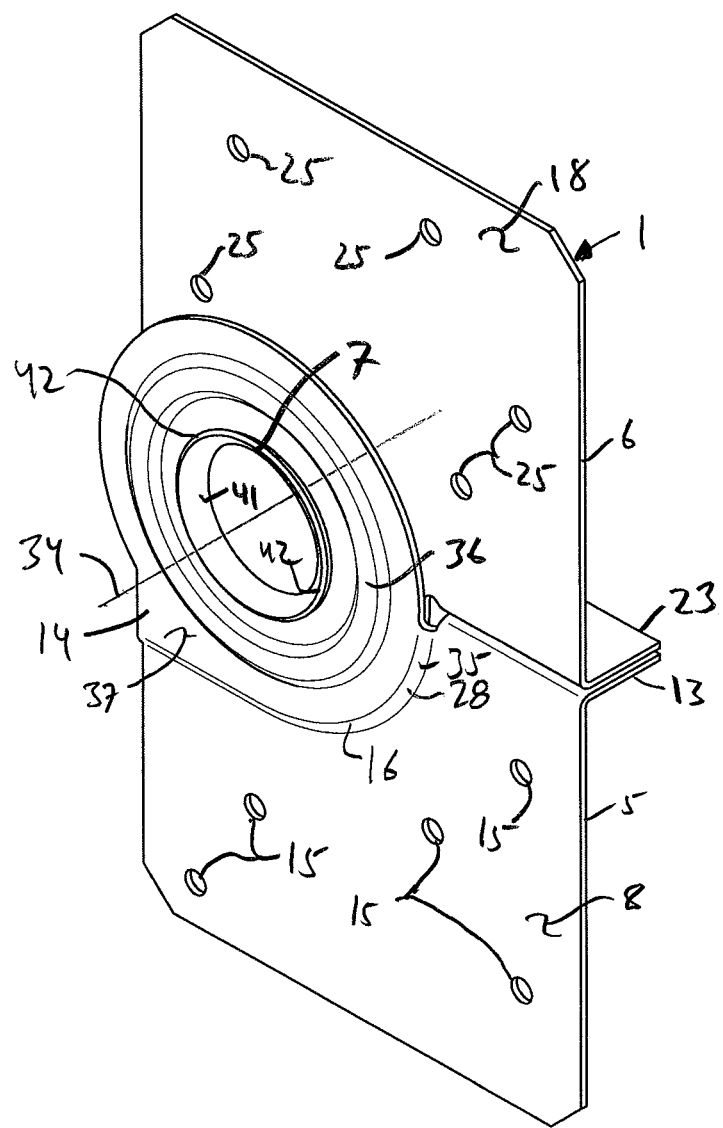
FIG. 1 is a front perspective view of the connector of the present invention.
Figure 2:
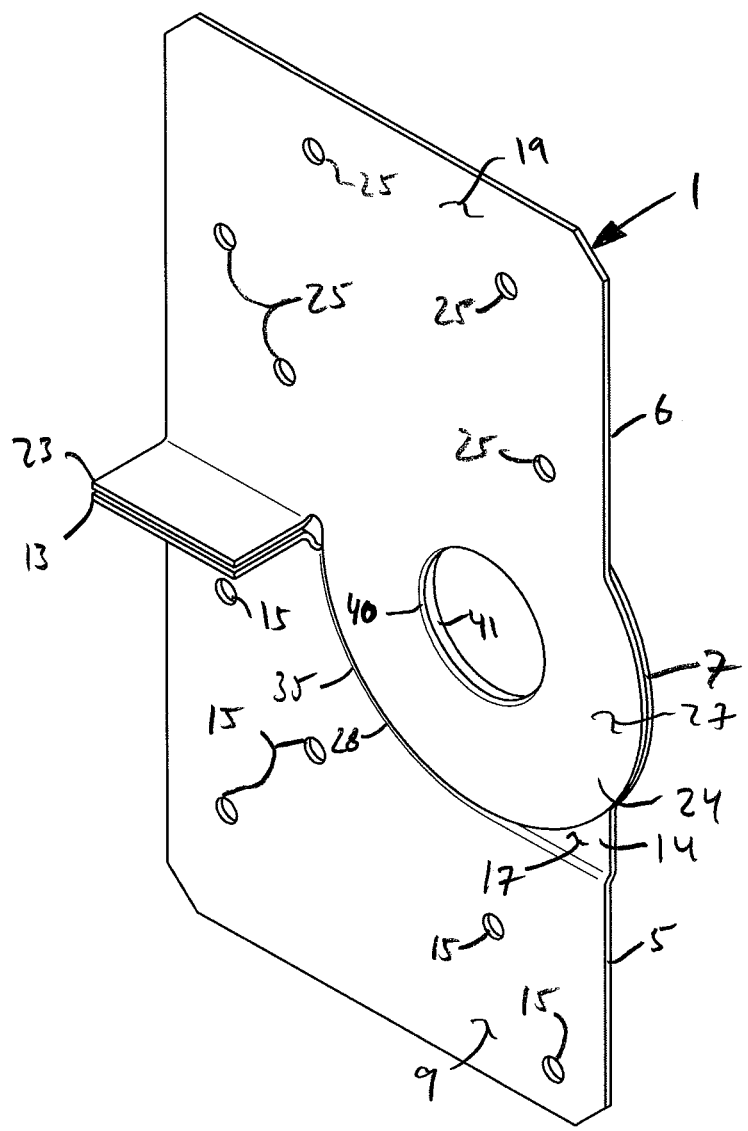
FIG. 2 is a back perspective view of the connector of FIG. 1.

As shown in FIG. 1, the connector 1 consists of a substantially planar base member 5 adapted to be connected to the first structural member 2. The base member 5 is formed with opposed front and back surfaces 8 and 9. The back surface 9 interfaces with the attachment surface 10 of the first structural member 2. The first structural member 2 can also have an adjoining edge surface 11 that is disposed orthogonally to the attachment surface 10. The attachment surface 10 and the edge surface 11 meet at an edge 12. The base member 5 can also be formed with an indexing flange 13 that is disposed orthogonally to the generally planar base member 5. The indexing flange 13 is designed to interface with the adjoining edge surface 11 and thereby position the fasteners 4 and the base member 5 with respect to the first structural member 2. The base member 5 is also formed with an offset extension 14 which is adapted to pivotally connect to a planar extension 24 that is connected to the top member 6. Preferably, the base member 5 is provided with fastener openings 15.

As shown in FIG. 1, the connector 1 also consists of a substantially planar top member 6 adapted to be connected to the second structural member 3. The top member 6 is formed with opposed front and back surfaces 18 and 19. The back surface 19 interfaces with the attachment surface 20 of the second structural member 3. The second structural member 3 can also have an adjoining edge surface 21 that is disposed orthogonally to the attachment surface 20. The attachment surface 20 and the edge surface 21 meet at an edge 22. The top member 6 can also be formed with an indexing flange 23 that is disposed orthogonally to the generally planar top member 6. The indexing flange 23 is designed to interface with the adjoining edge surface 21 and thereby position the fasteners 4 and the top member 6 with respect to the second structural member 3. Preferably, the top member 6 is provided with fastener openings 25. As shown and described the extension of the base member is offset from the plane of the base member and the extension of the top member lies in the plane of the top member, but the extension of the top member could just as easily be offset form the plane of the top member and the extension of base member could lie in the plane of the base member.

Figure 3:
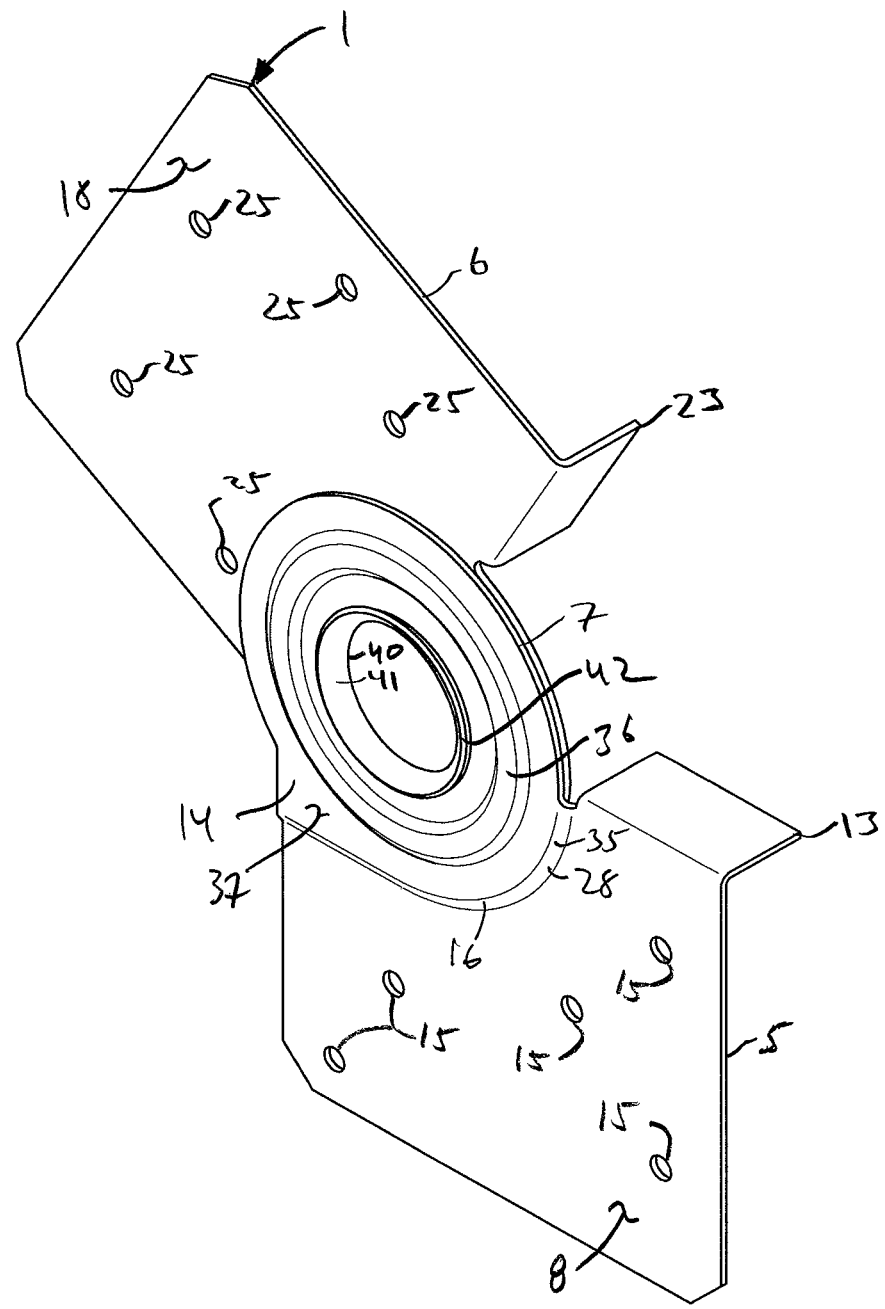
FIG. 3 is a front perspective view of the connector of the present invention with the members of the connector rotated about the hinge.
Figure 4:
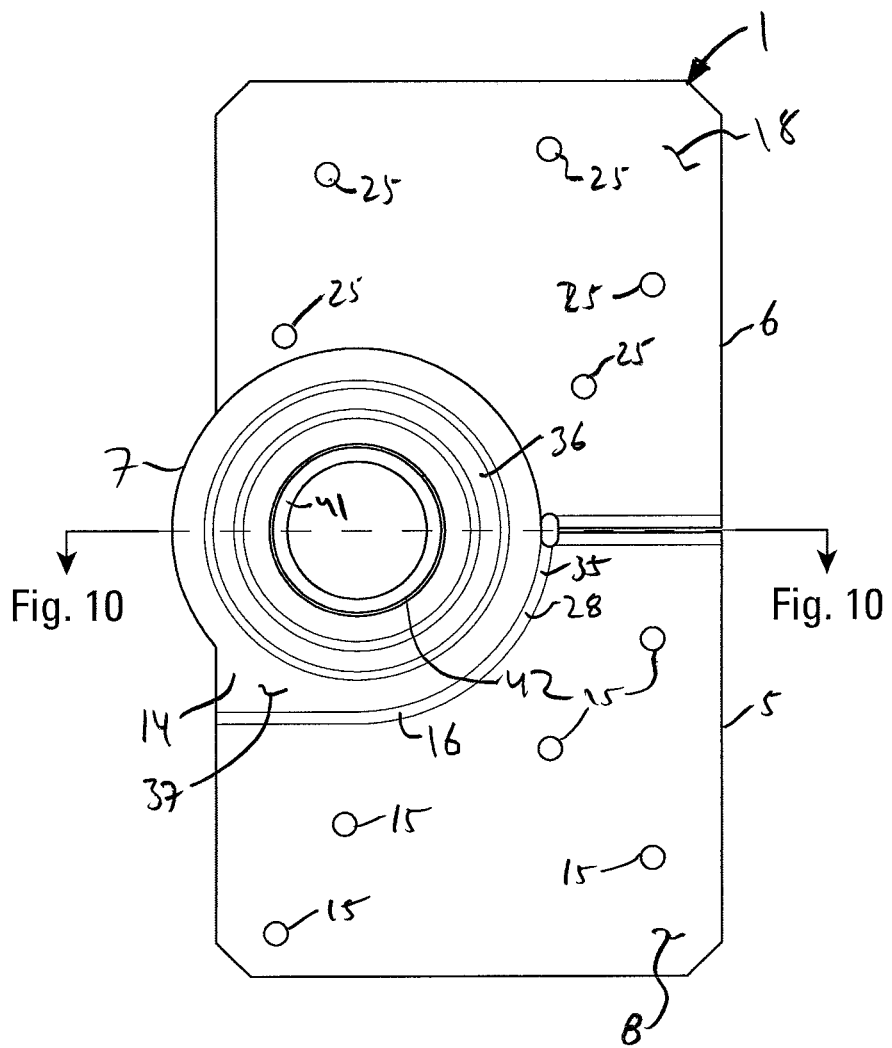
FIG. 4 is front view of the connector of FIG. 1.
Figure 5:
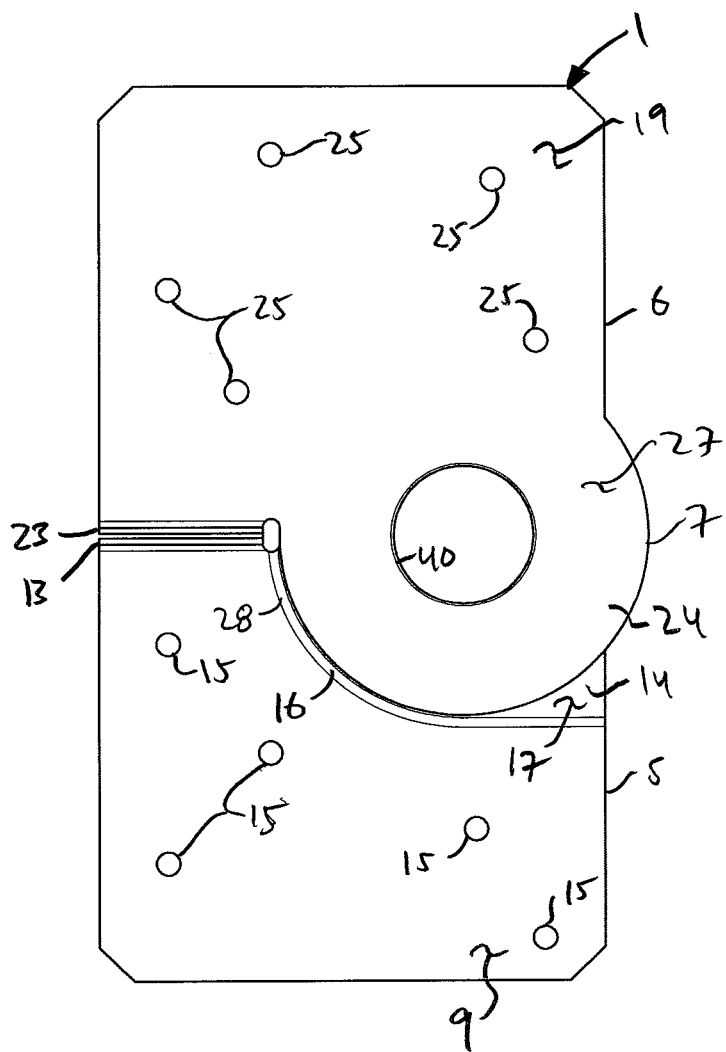
FIG. 5 is a back view of the connector of FIG. 1.
Figure 6:
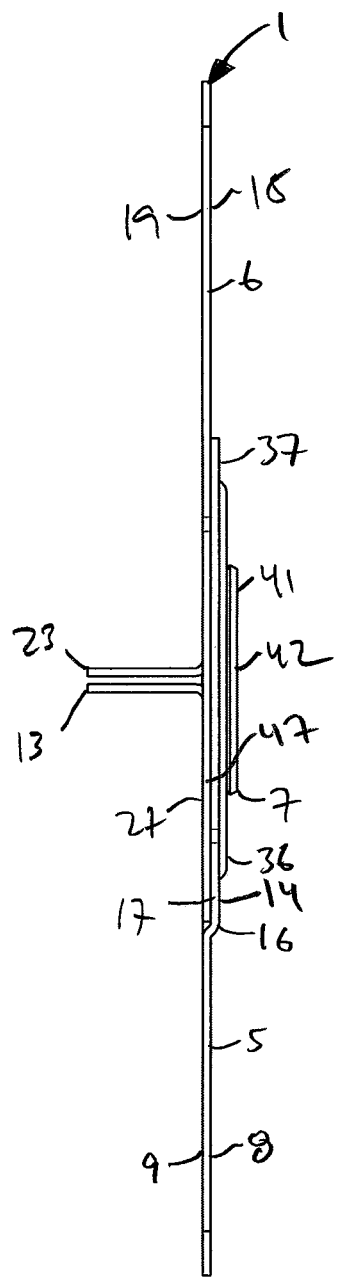
FIG. 6 is a left side view of the connector of FIG. 1.
Figure 7:
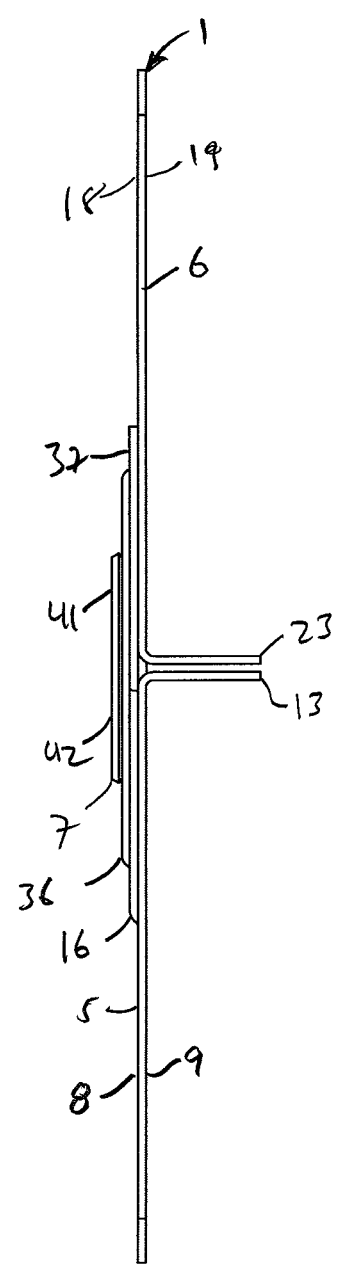
FIG. 7 is a right side view of the connector of FIG. 1.
Figure 8:
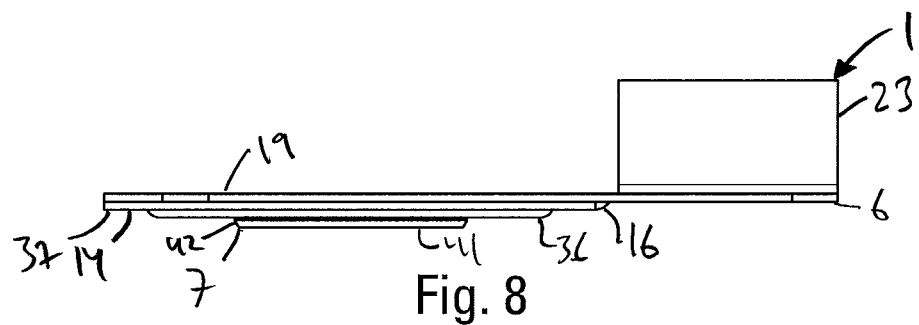
FIG. 8 is a top view of the connector of FIG. 1.
Figure 9:
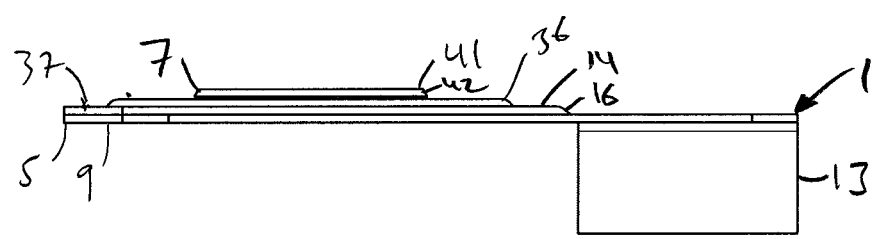
FIG. 9 is a bottom view of the connector of FIG. 1.
Figure 10:
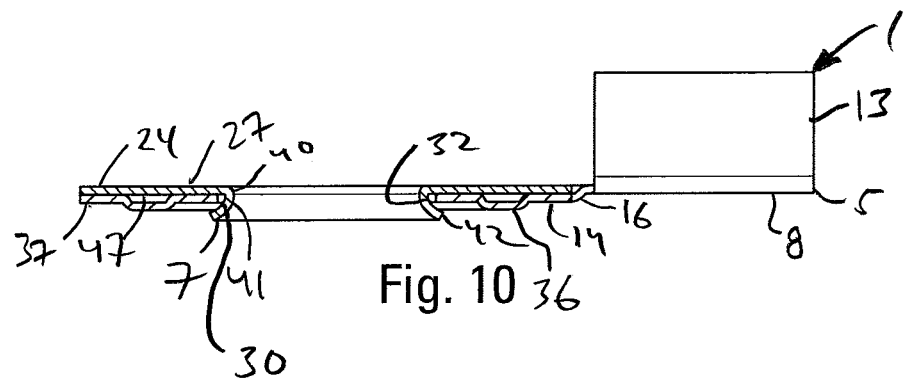
FIG. 10 is a cross-sectional, top view of the connector of FIG. 1 taken along the view line shown in FIG. 4.

As shown in FIGS. 3 and 10, the hinge 7 that connects the members 5 and 6 and allows the members to pivot with respect to each other can be formed in the following manner. The offset extension 14 of the base member 5 extends generally parallel to the base member 5, although it is offset from the plane of the base member 5 by a stepped juncture 16 where it is connected to the base member 5. The offset extension 14 has an inside face 17 and an outside face 37. The planar extension 24 is substantially planar and extends in line with the top member 6. The planar extension 24 has an inside face 27 and an outside face 47. The inside face 17 of the offset extension 14 overlies and interfaces with the outside face 47 of the planar extension 24.

The offset extension 14 is formed with a circular opening 30 and the planar extension 24 is formed with a corresponding circular opening 40. Preferably, the corresponding circular opening 29 is at least partially provided with one or more annular flanges 41 which project upwardly from the outside face 47 of the planar extension 24. If the entire opening is not circumscribed then at least a pair of opposed portions of the corresponding circular opening 40 are provided with one or more annular flanges 41. More preferably three or more portions of the circular opening 40 at intervals around the perimeter of the corresponding circular opening 40 are provided with one or more annular flanges 41. Most preferably the entire opening 40 is provided with one continuous annular flange 41. To form the hinge and join the two members 5 and 6 together, the offset extension 14 is placed over the planar extension 24 with the annular flange 41 of the corresponding circular opening 40 in the planar extension 24 being inserted through the circular opening 30 in the offset extension 14. The upper portion 42 of the annular flange 41 is then deformed to bend over an edge 32 of circular opening 30 in the offset extension 14. The bent upper portion 42 of the annular flange 41 extends radially outwardly and overlies the outside face 18 of the offset extension 14, connecting the two members 5 and 6 together. When connected in this manner, the extensions 14 and 24 can rotate with respect to each other around an axis 34 that is disposed orthogonally to the overlapping extensions 14 and 24. While the offset extension 14 has been described as being connected to the base member 5, the offset extension could extend from the top member 6 and the planar extension could be part of the base member 5. The annular flange 41 has been described, according the preferred embodiment, as projecting upwardly from the outside face 28 of the planar extension 24 such that the annular flange 41 extends away from the attachment surfaces 10 and 20 of the first and second 2 and 3 structural members. This arrangement of the members is preferred so as to allow the first and second structural members 2 and 3 to rotate with respect to each other without rubbing against the annular flange 41 of the hinge 7, but the annular flange 41 could project toward the attachment surfaces from the offset flange 14.

As noted above, the offset extension 14 is connected to the base member 5 at a stepped juncture 16. The stepped juncture 16 extends away from the attachment surfaces 10 and 20 of the first and second structural members 2 and 3. The stepped juncture 16 lifts the offset extension 14 approximately the thickness of the planar extension 24 away from the attachment surfaces 10 and 20 of the first and second structural members 2 and 3.

The stepped juncture 16 of the offset extension 14 is preferably formed with a curved portion 35 that conforms substantially to the curved edge portion 28 of the extension 24 of the top member. The curved portion 28 is an arc of a circle having its radius centered on the axis 34 of the hinge 7.

The extensions 14 and 24 are preferably offset with respect to the base and top members 5 and 6.

As discussed above, preferably, the base member 5 is provided with fastener openings 15, and the top member 6 is provided with fastener openings 25. Each of the base member 5 and the top member 6 is preferably formed with five fastener openings 15 or 25. To help prevent splitting of the first and second structural members 2 and 3 when they are made from wood, the openings 15 in the base member 5 are staggered with respect to each other and the openings 25 in the top member 6 are staggered with respect to each other.

Figure 15:
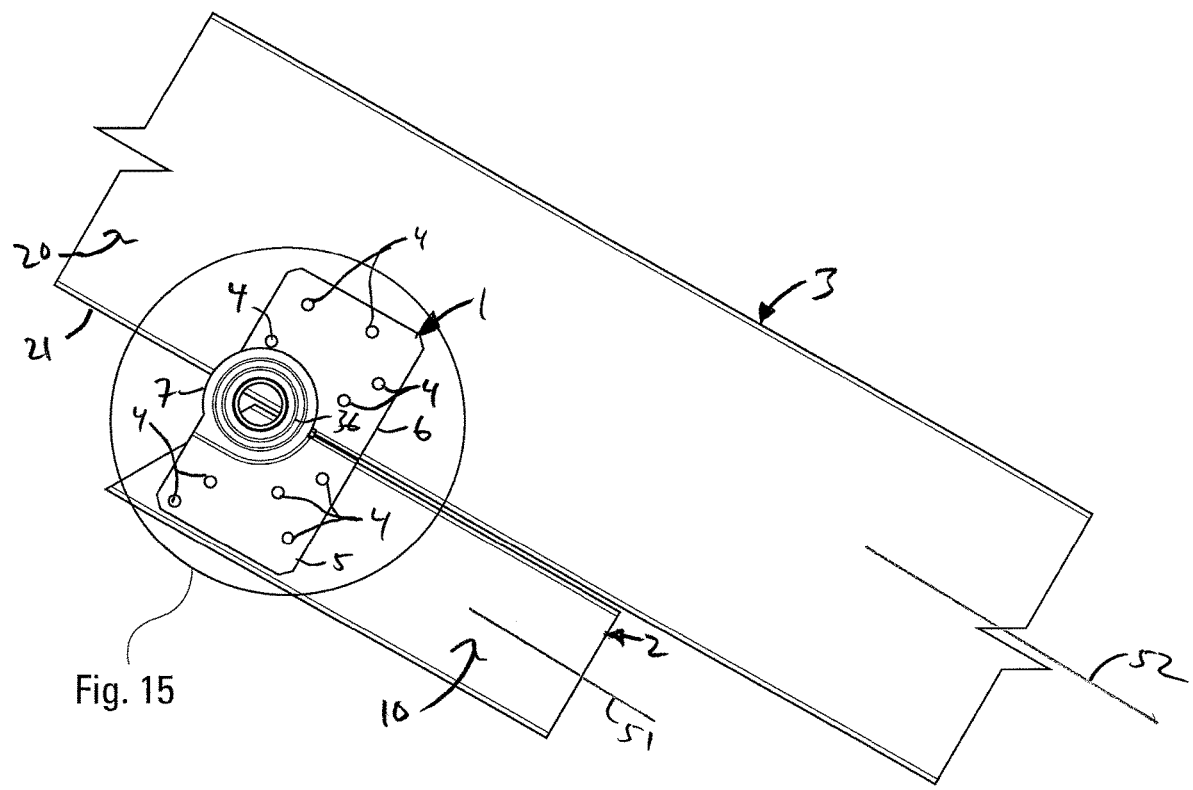
FIG. 15 is a side view of the connection shown in FIG. 15, except that a second connector is provided on the opposite sides of the structural members. The fasteners and the openings in the connector on the opposed sides are shown in dotted lines.

As shown in FIG. 15, the fasteners openings 15 in the base member 5 are arranged so that if a line was drawn between the centers of two of the fastener openings 15 in the base member 5 that same line would not intersect with any of the centers of the other fastener openings 15. Similarly, the fastener openings 25 in the top member 6 are arranged so that if a line was drawn between two of the fastener openings 25 in the top member 6 that same line would not intersect with any of the centers of the other fastener openings 25.

To also help prevent splitting when wood structural members 2 and 3 are used, any line drawn through the centers of two of the fastener openings 15 in the base member 5 would not be parallel to the long axis 51 or 52 of the first or second structural member 2 or 3 to which the base member 5 is attached. Similarly, any line drawn through the centers of two of the fastener openings 25 in the top member 6 would not be parallel to the long axis 51 or 52 of the first or second structural member 2 or 3 to which the top member 6 is attached. As shown in FIG. 15, preferably the planar indexing flanges 13 and 23 are disposed parallel with the long axes 51 and 52 of the first and second structural members 2 and 3, and the long axes 51 and 52 are disposed parallel with the adjoining edges surfaces 11 and 21.

The indexing flanges 13 and 23 are substantially aligned with a diameter through the circular openings 30 and 40 in the extensions 14 and 24. When the connector 1 is in a folded position the indexing flange 23 of the top member 6 contacts the indexing flange 13 of the base member 13.

Figure 14:
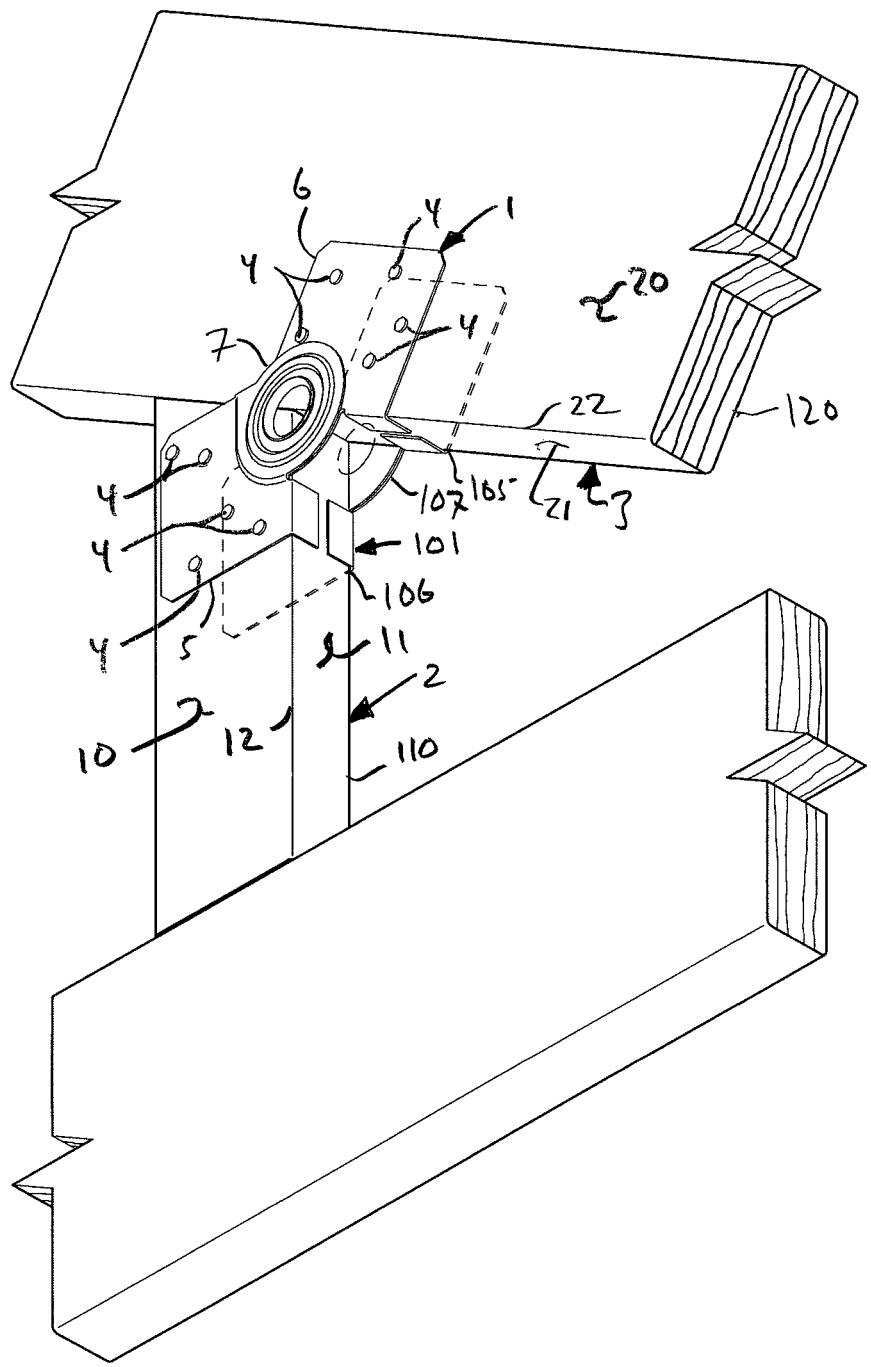
FIG. 14 is a perspective view of the connection shown in FIG. 13 with a second connector attached to the opposite faces of the structural members.
Figure 15:
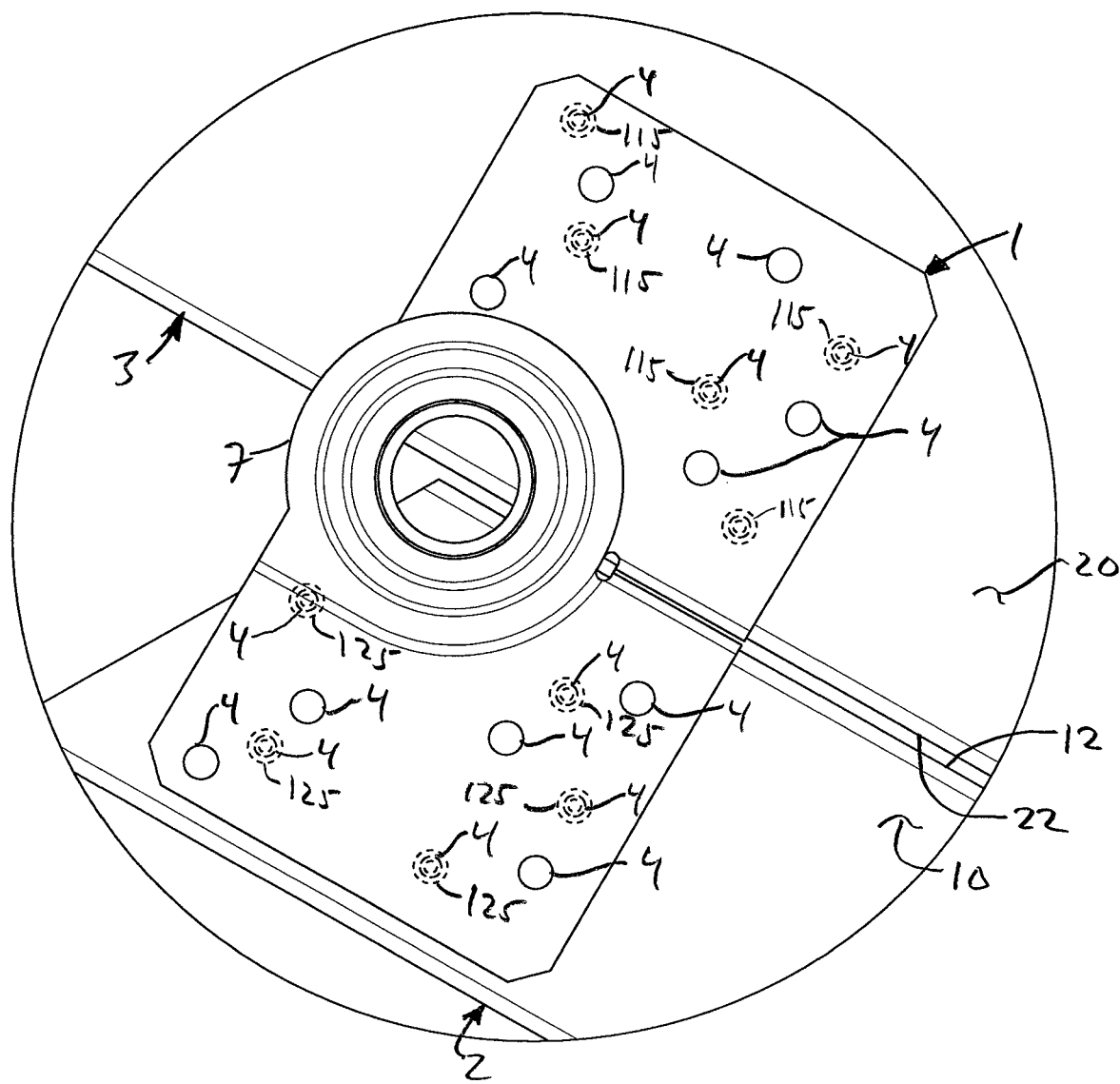

As shown in FIG. 14, the first structural member 2 is also formed with a second opposed attachment surface 110, and the second structural member 3 is also formed with a second opposed attachment surface 120. The adjoining edge surface 11 connects the attachment surfaces 10 and 110 of the first structural member 2, and the adjoining edge surface 21 connects the attachment surfaces 20 and 120 of the second structural member 3.

A second connector 101 is attached to the opposed attachment surfaces 110 and 120 of the first and second structural members 2 and 3. The second connector 101 shown in FIG. 14 is identical to the connector 1 shown in FIG. 14, except that the second connector 101 is disposed upside down with the base member 105 being connected to the second structural member 3 and the top member 106 being connected to the first structural member 2. The second connector 101 has a hinge 107, and the base member 105 is formed with fastener openings 115 that are arranged in the same positions as the fastener openings 15 of the base member 5 of the first connector 1, and the top member 106 of the second connector 101 is formed with fastener openings 125 that are arranged in the same positions as the fastener openings 25 of the top member 6 of the first connector 1.

When the first or hinged connector 1 and an identical second connector 101 are installed in a pair with the second connector 101 being installed up-side down with respect to the first connector 1 to connect first and second member 2 and 3, the hinges 7 and 107 of the connectors will need to be aligned for the pivoting action to work properly. When installed appropriately as described, the base member 5 of the first connector 1 and the top member 106 of the second connector 101 will both be attached to the first structural member 2 with the base member 5 and the top member 106 overlying each other on the opposite surfaces 10 and 110 of the first structural member 2, and with the fastener openings 15 of the base member 5 of the first connector 1 being staggered with respect to the fastener openings 125 of the top member 106 of the second connector 101. At the same time, the base member 105 of the second connector 101 and the top member 6 of the first connector 1 will both be attached to the second structural member 3 with the base member 105 and the top member 6 overlying each other on the opposite surfaces 20 and 220 of the second structural member 3, and with the fastener openings 115 of the base member 105 of the second connector 101 being staggered with respect to the fastener openings 25 of the top member 6 of the first connector 1.

The connector is installed by placing the first and second structural member 2 and 3 in their installed positions. The connector 1 is then placed in interfacing engagement with the attachment surfaces 10 and 20 of the first and second members 2 and 3 with the indexing flanges 13 and 23 engaging the edge surfaces 11 and 21. Fasteners 4 are then driven through the openings 15 and 25 in the base and top members 5 and 6 to attach the connector 1 to the first and second members 2 and 3. If a second connector 101 is used, the first and second structural members 2 and 3 can be turned over and the second connector 101 is installed similarly with the base member 105 connected to the structural member that is attached to the top member 6 of the first connector 1.

As shown in FIG. 1, the offset extension 14 of the base member 5 is formed with one or more embossments 36 with the one or more embossments 36 circumscribing or partially circumscribing the opening 30 in the offset extension. Preferably the embossment 36 is a single, continuous member that completely circumscribes the opening 30. The embossment 36 preferably projects away from the first and second structural members 2 and 3.

We claim:
1. A connection for attaching a first structural member to a second structural member using a hinged connector, the connection comprising:
   a. the first structural member having a planar attachment surface and an adjoining edge surface;
   b. the second structural member having a planar attachment surface and an adjoining edge surface, the attachment surface of the second structural member lying in the same plane as the attachment surface of the first structural member;
   c. the hinged connector attached to the first structural member and the second structural member, the hinged connector including:
      1. a substantially planar base member attached to the first structural member;
      2. a substantially planar top member attached to the second structural member and extending in the same plane as the base member;
      3. each of the base member and the top member having an extension, the extension of the base member overlapping with the extension of the top member, with one of the extensions extending in the same plane as the top member and the base member, and the other extension being offset from the top member and the base member, each of the extensions having a circular opening formed with an edge, one of the openings being formed with one or more flanges at the edge of the opening, the one or more flanges being received by the other of the openings with the one or more annular flanges extending over the edge of the opening and away from the edge of the opening to create a hinge, connecting the base member and the top member for pivoting movement;
   d. one or more fasteners connecting the base member to the first structural member and the top member to the second structural member;
   e. the extension that is offset is substantially planar and defines a plane; and
   f. one or more embossments are formed in the extension that is offset from the top member and the base member with the one or more embossments circumscribing or partially circumscribing the opening in the extension that is offset, and the one or more embossments project away from the first and second structural members and out of the plane defined by the extension that is offset, and the edge of the opening of the extension that is offset lies in the plane defined by the extension that is offset.

2. The connection of claim 1, wherein:
the one or more annular flanges extending over the edge of the opening and away from the edge of the opening, connecting the base member and the top member for pivoting movement is a single, continuous flange that completely circumscribes the opening to which the annular flange is attached.

3. The connection of claim 1, wherein:
the one or more embossments formed in the extension that is offset from the top member and the base member is a single, continuous embossment that completely circumscribes the opening in the extension that is offset.

4. The connection of claim 3, wherein:
the single, continuous embossment is circular.

5. The connection of claim 1, wherein:
indexing flanges are attached to the top member and the base member, and one of the indexing flanges interfaces with the adjoining edge surface of the first structural member and one of the indexing flanges interfaces with the adjoining edge surface of the second structural member.

6. The connection of claim 5, wherein:
the indexing flanges are substantially planar and substantially aligned with a diameter through the circular openings in the extensions.

7. The connection of claim 6, wherein:
the indexing flange of the top member can contact the indexing flange of the base member.

8. The connection of claim 1, wherein:
the base member is only attached to two surfaces of the first structural member and the top member is only attached to two surfaces of the second structural member.

9. The connection of claim 1, wherein:
the extension that is offset is formed with a stepped juncture that is formed with a curved portion where the extension that is offset meets the top member or the base member, and the curved portion is an arc of a circle having a radius centered on the axis of the hinge.

10. The connection of claim 1, wherein:
a. the first structural member is formed with a second opposed attachment surface with the adjoining edge surface of the first structural member connecting the first attachment surface and the second opposed attachment surface of the first structural member;
b. the second structural member is also formed with a second opposed attachment surface and the adjoining edge surface of the second structural member connecting the attachment surface and the second opposed attachment surface of the second structural member;
c. a second connector identical to the hinged connector attached to the planar attachment surfaces of the first and second structural members is attached to the second opposed attachment surfaces of the first and second structural members, the second connector having a base member connected to the second structural member and a top member connected to the first structural member, the second connector also having a hinge and the base member of the second connector is formed with one or more fastener openings that are arranged in the same position as the one or more fasteners of the base member of the hinged connector, and the top member of the second connector is formed with one or more fastener openings that are arranged in the same position as the one or more fasteners of the top member of the hinged connector;
d. the hinge of the second connector and the hinge of the hinged connector are aligned, the base member of the hinged connector and the top member of the second connector overlie each other on the first structural member with the fastener openings of the base member of the hinged connector being staggered with respect to the fastener openings of the top member of the second connector, and the base member of the second connector and the top member of the hinged connector overlie each other with the fastener openings of the base member of the second connector being staggered with respect to the fastener openings of the top member of the first connector.

11. The connection of claim 10, wherein:
in the second connector the one or more annular flanges extending over the edge of the opening and away from the edge of the opening, connecting the base member and the top member for pivoting movement is a single, continuous flange that completely circumscribes the opening to which the annular flange is attached.

12. The connection of claim 10, wherein:
a. in the second connector the extension that is offset is substantially planar and defines a plane; and
b. in the second connector one or more embossments are formed in the extension that is offset from the top member and the base member with the one or more embossments circumscribing or partially circumscribing the opening in the extension that is offset, and the one or more embossments project away from the first and second structural members and out of the plane defined by the extension that is offset, and the edge of the opening of the extension that is offset lies in the plane defined by the extension that is offset one or more embossments are formed in the extension that is offset from the top member and the base member with the one or more embossments circumscribing or partially circumscribing the opening in the extension that is offset.

13. The connection of claim 12, wherein:
in the second connector the one or more embossments formed in the extension that is offset from the top member and the base member is a single, continuous embossment that completely circumscribes the opening in the extension that is offset.

14. The connection of claim 13, wherein:
in the second connector the single, continuous embossment is circular.

15. The connection of claim 10, wherein:
in the second connector indexing flanges are attached to the top member and the base member, and one of the indexing flanges interfaces with the adjoining edge surface of the first structural member and one of the indexing flanges interfaces with the adjoining edge surface of the second structural member.

16. The connection of claim 15, wherein:
in the second connector the indexing flanges are substantially planar and substantially aligned with a diameter through the circular openings in the extensions.

17. The connection of claim 16, wherein:
in the second connector the indexing flange of the top member can contact the indexing flange of the base member.

18. The connection of claim 10, wherein:
in the second connector the base member is only attached to two surfaces of the first structural member and the top member is only attached to two surfaces of the second structural member.

19. The connection of claim 10, wherein:
in the second connector the extension of the base member and the extension of the top member are formed with a curved portion where the extension of the top member meets the top member and where the extension of the base member meets the base member.

* * * * *